Patented Aug. 7, 1934

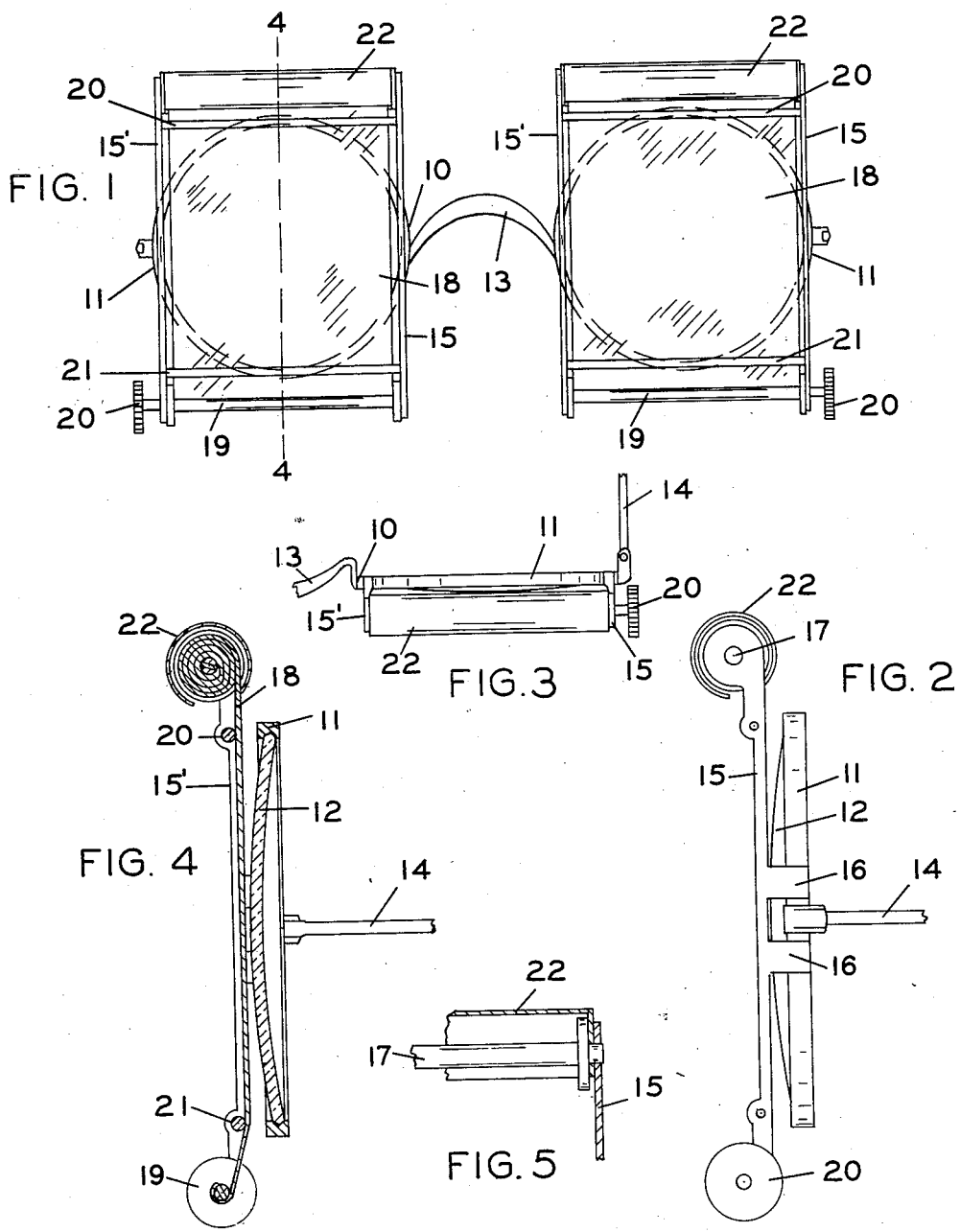

1,969,710

UNITED STATES PATENT OFFICE 1,969,710

DEVICE FOR GOGGLES AND THE LIKE

Roscoe C. Jones, Jefferson, N. Y., assignor to Bausch & Lomb Optical Company, Rochester, N. Y., a corporation of New York Application December 17, 1931, Serial No. 581,606

9 Claims. (Cl. 2—14)

This invention relates to eye protective devices such as goggles and the like and more particularly it has reference to a device whereby a protective material in front of the eye may be selectively renewed.

In the pursuit of certain industrial arts and occupations such as painting, and the like, it is necessary for the workmen to wear goggles in order to properly protect the eyes. This is especially necessary where paint, white-wash or calcimine are applied by spraying. In such cases, however, the lenses of the goggles soon become spattered with paint so that good vision is no longer possible. Rather than go to the bother and inconvenience of frequently cleaning the goggle lenses, workmen often refuse to wear any kind of goggles. In other occupations and pursuits where goggles are customarily worn, much trouble often arises due to impaired vision caused by the accumulation of dust, sleet, moisture and other foreign matter on the surfaces of the lenses. Under such conditions, the wearer is put to the inconvenience of frequently cleaning the lenses in order to obtain unimpaired vision.

One of the objects of my invention is to provide an eye protective device having a protective material which may be selectively renewed. Another object is to provide a goggle having means whereby a transparent material may be conveniently renewed. A further object is to provide a transparent protective material which is positioned in front of a lens and arranged for convenient renewal. These and other objects and advantages reside in certain novel features of construction, arrangement and combination of parts as will hereinafter be more fully described and pointed out in the appended claims.

Referring to the drawing:

Fig. 1 shows a front view of a pair of goggles embodying my invention.

Fig. 2 is a side elevation of same.

Fig. 3 is a top plan view of a portion of the goggle.

Fig. 4 is a sectional view taken on line 4—4 of Fig. 1.

Fig. 5 is a view showing a detail.

One embodiment of my invention is shown in the drawing wherein 10 indicates a conventional type of spectacle or goggle frame having the two eye wires 11 providing sight openings in which lenses 12 are mounted. The eye wires 11 are connected by a suitable bridge 13 and provided with temples 14. Positioned in front of the lens 12 are the two spaced side plates 15 and 15' having integral fingers 16 which are soldered or otherwise secured to eye wire 11. A roller 17 is journalled between the plates 15 and 15' and carries a roll of transparent, flexible material 18. Such material should preferably be relatively thin so that a considerable amount can be rolled up without producing too large a roll. Certain cellulosic sheet material, such as that which is now widely used for wrapping merchandise, can be successfully used, although any other suitable transparent material could also be used.

At the lower end of plates 15 and 15' the take-up roller 19 is rotatably mounted and adapted to be turned by the knurled knob 20. Mounted between the two plates 15 and 15' are the upper and lower cross rods 20 and 21 which together with the side plates 15 and 15' serve to guide the sheet material 18 from the upper supply roller 17 across the lens and down to the take-up roller 19. The two cross rods 20 and 21 thus serve to keep the sheet material from buckling out away from the lens. The material 18 on the supply roller 17 is protected by a guard member 22 which has apertures which fit over the ends of roller 17 as shown in Fig. 5. The upper and lower ends of side plates 15 and 15' are preferably bent inward a slight amount so as to hold the rollers 17 and 19 under tension and thereby keep the material 18 from accidental unrolling and buckling.

In operation, a supply roll 17 of material is put in position, the sheet material is run under guide rods 20 and 21 and down to the take-up roller 19. It will thus be obvious that the sheet material in front of the lens 12 can be selectively renewed by merely turning knob 20. Thus, whenever the material in front of the lens 12 becomes so covered with paint, moisture or other foreign material as to impair the vision, it is only necessary to bring a new supply of sheet material down across the lens by turning knob 20.

From the foregoing it will be apparent that I am able to attain the objects of my invention and provide an improved eye protective device having a transparent material which can be renewed conveniently at will. My invention can obviously be applied to various types of goggles, spectacles and other similar devices, as will be apparent to those skilled in the art. My device could also be used on a goggle frame without lenses, in which case the transparent, flexible material would be the only protective layer in front of the eye. Instead of rolling up the used material it could be torn off against a suitable edge. The rolls of transparent material are relatively inexpensive and can be readily renewed. Various modifications can obviously be made without departing from the spirit of my invention.

I claim:

1. A goggle having a frame provided with a sight opening, a supply roll of transparent sheet material mounted adjacent to said opening, said supply comprising a relatively long narrow strip and means for selectively moving portions of said material across said opening whereby the material across said opening may be selectively renewed.

2. A goggle having in combination a frame provided with sight openings adapted to be positioned before the eyes of a wearer, a supply roll of flexible, transparent material carried by said frame adjacent to each of said openings, said material extending from said roll across the opening whereby the area of material across the opening may be selectively renewed from said supply roll.

3. A goggle comprising a frame having two sight openings adapted to be positioned in front of the eyes of a wearer, a supply roll of transparent, flexible material carried by said frame adjacent to each opening, means carried by said frame for guiding said material across each opening and means for moving said material from each roll across the adjacent opening.

4. A protective device of the character described comprising a frame having a sight opening adapted to be positioned in front of the eye of a wearer, a supply roll of transparent, flexible material carried by said frame and means for guiding said material from said roll across the opening whereby the material across said opening may be selectively renewed from said roll.

5. A goggle having in combination a frame having a sight opening, a supply roll of transparent, flexible material mounted on said frame above the opening, guide means extending downwardly from said roll for guiding said material across said opening and a take-up roll mounted below said opening whereby different portions of said material may be selectively positioned across said opening.

6. A device of the character described comprising a frame provided with lenses, a supply of transparent material mounted on said frame adjacent to each lens, means for protecting said supply material, guide means positioned adjacent to each lens and means for selectively moving portions of said material along said guide means and in front of said lens.

7. A goggle comprising a frame carrying two lenses, a supply of relatively thin, transparent sheet material positioned adjacent to each lens and means for selectively moving across the face of each lens several successive portions of said material which have substantially the same areas as the lens.

8. A protective device having in combination a frame provided with a sight opening adapted to be positioned before the eye of a wearer, a supply of transparent sheet material carried by said frame, said supply comprising a relatively long, narrow strip of material whose width is substantially equal to that of said opening and means for selectively positioning different successive portions of said material across said opening.

9. A goggle comprising a frame having a sight opening, a supply roll of transparent material carried by said frame, means providing a protective covering for said supply roll of material and means for selectively moving portions of said material from said covering to an exposed position across said sight opening.

ROSCOE C. JONES.